(12) United States Patent
Matsushita et al.

(10) Patent No.: US 6,933,656 B2
(45) Date of Patent: Aug. 23, 2005

(54) ULTRASONIC MOTOR HAVING INTEGRATED ELECTRODES AND MANUFACTURING METHOD OF THE SAME

(75) Inventors: Yukihiro Matsushita, Hamakita (JP); Motoyasu Yano, Kosai (JP); Masahiko Komoda, Toyokawa (JP)

(73) Assignee: Asmo Co., Ltd., Shizuoka-pref. (JP)

(*) Notice: Subject to any disclaimer, the term of this patent is extended or adjusted under 35 U.S.C. 154(b) by 0 days.

(21) Appl. No.: 10/773,439

(22) Filed: Feb. 9, 2004

(65) Prior Publication Data

US 2004/0160146 A1 Aug. 19, 2004

(30) Foreign Application Priority Data

Feb. 12, 2003 (JP) ........................................ 2003-033459

(51) Int. Cl.⁷ .............................................. H01L 41/08
(52) U.S. Cl. ............................ 310/323.12; 310/323.16; 310/325; 310/366
(58) Field of Search ................................ 310/325, 328, 310/365, 366, 323.02, 323.12

(56) References Cited

U.S. PATENT DOCUMENTS

| | | | |
|---|---|---|---|
| 4,637,246 A | * | 1/1987 | Lombard et al. .......... 73/35.11 |
| 4,651,310 A | * | 3/1987 | Kaneko et al. ............. 367/140 |
| 5,155,409 A | * | 10/1992 | Swanson et al. ............ 310/366 |
| 5,168,189 A | * | 12/1992 | Dam et al. .................. 310/328 |
| 5,998,908 A | * | 12/1999 | Goodson .................... 310/325 |
| 6,018,213 A | | 1/2000 | Yano |

FOREIGN PATENT DOCUMENTS

| | | |
|---|---|---|
| JP | Y2-2529875 | 3/1997 |
| JP | B2-3059040 | 7/2000 |
| JP | B2-3181619 | 7/2001 |
| JP | A-2002-67316 | 3/2002 |

* cited by examiner

*Primary Examiner*—Mark Budd
(74) *Attorney, Agent, or Firm*—Posz Law Group, PLC (57) ABSTRACT

A stator includes first and second piezoelectric elements, a flexible aluminum-based connective arrangement and upper and lower aluminum-based metal blocks. The flexible aluminum-based connective arrangement includes first to fourth aluminum-based electrodes, which apply a voltage to the piezoelectric elements to generate a vibration. Each aluminum-based electrode is made of one of aluminum and an aluminum alloy and directly contacts a corresponding one of axial ends of the piezoelectric elements. Each aluminum-based metal block is made of one of aluminum and an aluminum alloy. The piezoelectric elements and the aluminum-based electrodes are interposed between the aluminum-based metal blocks.

9 Claims, 6 Drawing Sheets

ULTRASONIC MOTOR HAVING INTEGRATED ELECTRODES AND MANUFACTURING METHOD OF THE SAME

CROSS REFERENCE TO RELATED APPLICATION

This application is based on and incorporates herein by reference Japanese Patent Application No. 2003-33459 filed on Feb. 12, 2003.

BACKGROUND OF THE INVENTION

1. Field of the Invention

The present invention relates to an ultrasonic motor and a manufacturing method thereof.

2. Description of Related Art

Figure 8:
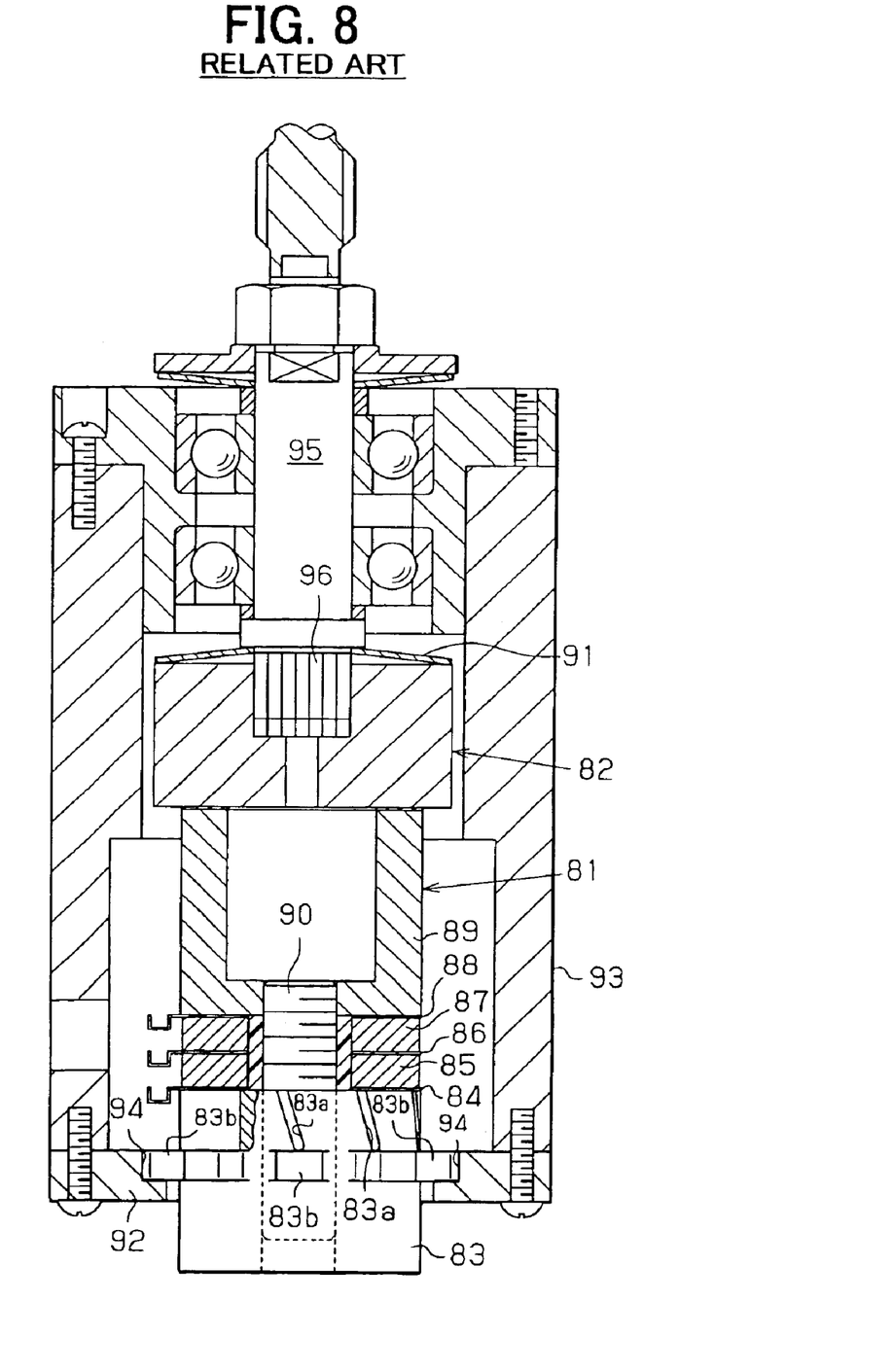
FIG. 8 is a schematic cross sectional view of a previously proposed actuator.

Various Langevin type ultrasonic motors, each of which has a generally cylindrical shape and generates a standing wave, have been known (e.g., one disclosed in U.S. Pat. No. 6,018,213 corresponding to Japanese Unexamined Patent Publication No. 11-155288). FIG. 8 shows an actuator having one previously proposed Langevin type ultrasonic motor. The previously proposed ultrasonic motor includes a stator 81 and a rotor 82. The stator 81 is formed into a generally cylindrical shape. Furthermore, the stator 81 includes an upper metal block 89, a first electrode plate 88, a first piezoelectric element 87, a second electrode plate 86, a second piezoelectric element 85, a third electrode plate 84 and a lower metal block 83, which are stacked in this order from top to bottom of the stator 81 and are fastened by a bolt 90 that extends therethrough. A plurality of slits 83a is formed in an outer peripheral surface of the lower metal block 83 in such a manner that the slits 83a are circumferentially arranged at generally equal angular intervals. The slits 83a generate a torsional vibration in response to a longitudinal vibration generated by the first and second piezoelectric elements 87, 85. The rotor 82 is formed into a generally cylindrical shape. The rotor 82 is urged against a top end surface of the stator 81, i.e., a top end surface of the upper mental block 89 by a Belleville spring 91.

When a high frequency voltage is applied to the first to third electrode plates 88, 86, 84, a longitudinal vibration is generated by the first and second piezoelectric elements 87, 85, and a torsional vibration is generated by the slits 83a in response to the longitudinal vibration. Thus, the rotor 82 is rotated by these vibrations.

In the previously proposed ultrasonic motor shown in FIG. 8, the first to third electrode plates 88, 86, 84, which are made of copper or its alloy, are used as conductive members that are electrically connected to the first and second piezoelectric elements 87, 85. The lower and upper metal blocks 83, 89 are made of aluminum or its alloy. In order to perform appropriate recycling of materials of the ultrasonic motor, the first to third electrode plates 88, 86, 84 (copper or its alloy) need to be removed from the stator 81 (aluminum or its alloy). However, in the stator 81, the first to third electrode plates 88, 86, 84 are fastened between the lower metal block 83 and the upper metal block 89, so that it is difficult to remove the first to third electrode plates 88, 86, 84 from the lower and upper metal blocks 83, 89, resulting in low recyclability of the materials.

SUMMARY OF THE INVENTION

The present invention addresses the above disadvantages. Thus, it is an objective of the present invention to provide an ultrasonic motor having improved recyclability of materials of the ultrasonic motor. It is another objective of the present invention to provide a manufacturing method of such an ultrasonic motor.

To achieve the objectives of the present invention, there is provided an ultrasonic motor including a stator and a rotor. The stator includes at least one piezoelectric element, a flexible aluminum-based connective arrangement and a plurality of aluminum-based metal blocks. The flexible aluminum-based connective arrangement includes a plurality of aluminum-based electrodes, which apply a voltage to the at least one piezoelectric element to generate a vibration from the at least one piezoelectric element. Each aluminum-based electrode is made of one of aluminum and an aluminum alloy and directly contacts a corresponding one of axial ends of the at least one piezoelectric element. Each aluminum-based metal block is made of one of aluminum and an aluminum alloy. The at least one piezoelectric element and the aluminum-based electrodes are interposed between corresponding two of the aluminum-based metal blocks. The rotor is slidably and rotatably urged against the stator. The rotor is rotated upon generation of the vibration in the stator.

To achieve the objectives of the present invention, there is further provided a method for manufacturing an ultrasonic motor. In the method, a flexible aluminum-based connective arrangement is first formed. The flexible aluminum-based connective arrangement is planar and includes a plurality of aluminum-based electrodes, each of which is made of one of aluminum and an aluminum alloy. Then, a stator is constructed by assembling the flexible aluminum-based connective arrangement, at least one piezoelectric element and a plurality of aluminum-based metal blocks. Each aluminum-based metal block is made of one of aluminum and an aluminum alloy. At this stage, the flexible aluminum-based connective arrangement is bent, and each aluminum-based electrode directly contacts a corresponding one of axial ends of the at least one piezoelectric element. Thereafter, a rotor is installed to the stator in such a manner that the rotor is slidably and rotatably urged against the stator.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
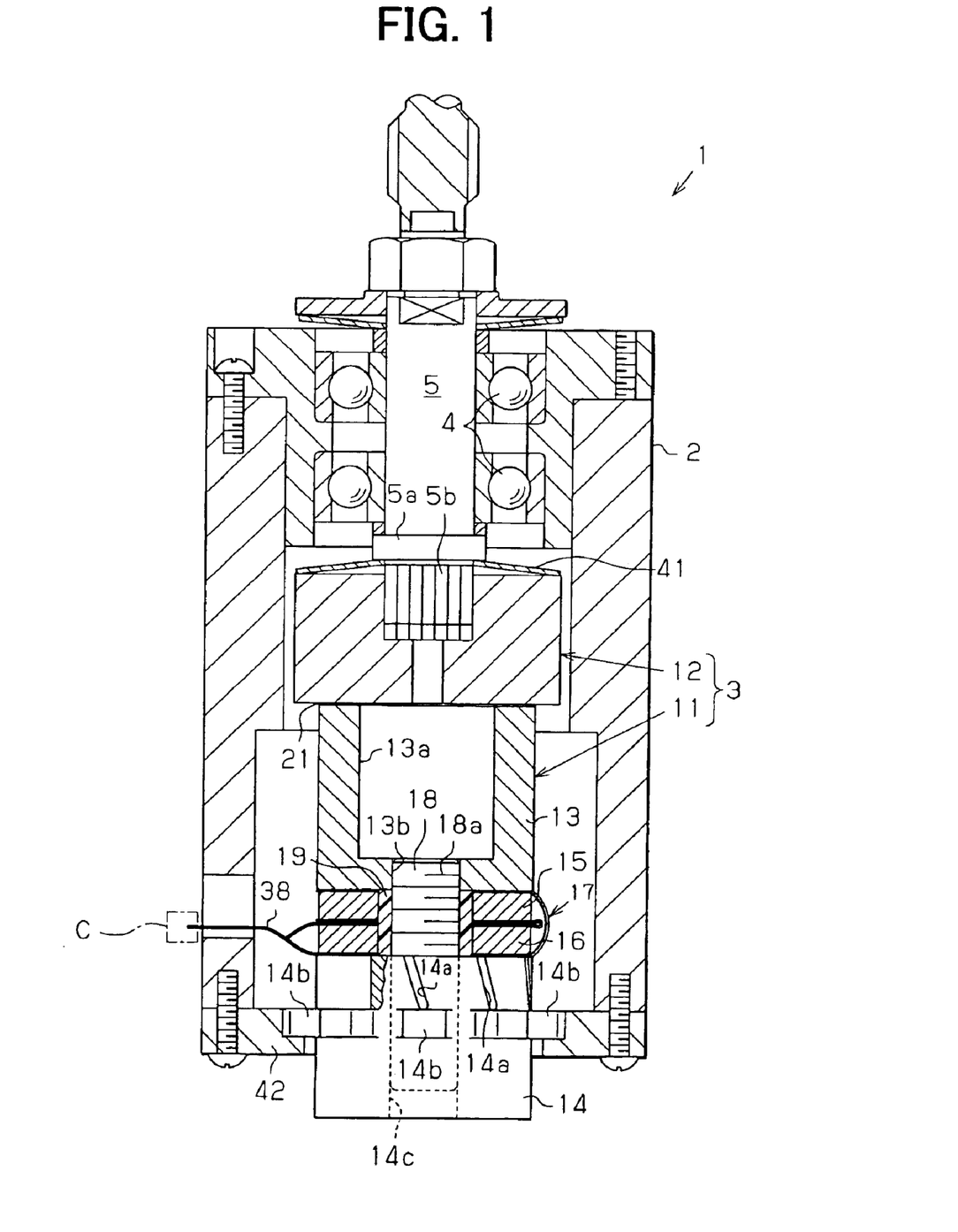
FIG. 1 is a schematic cross sectional view of an actuator according to an embodiment of the present invention.
Figure 2:
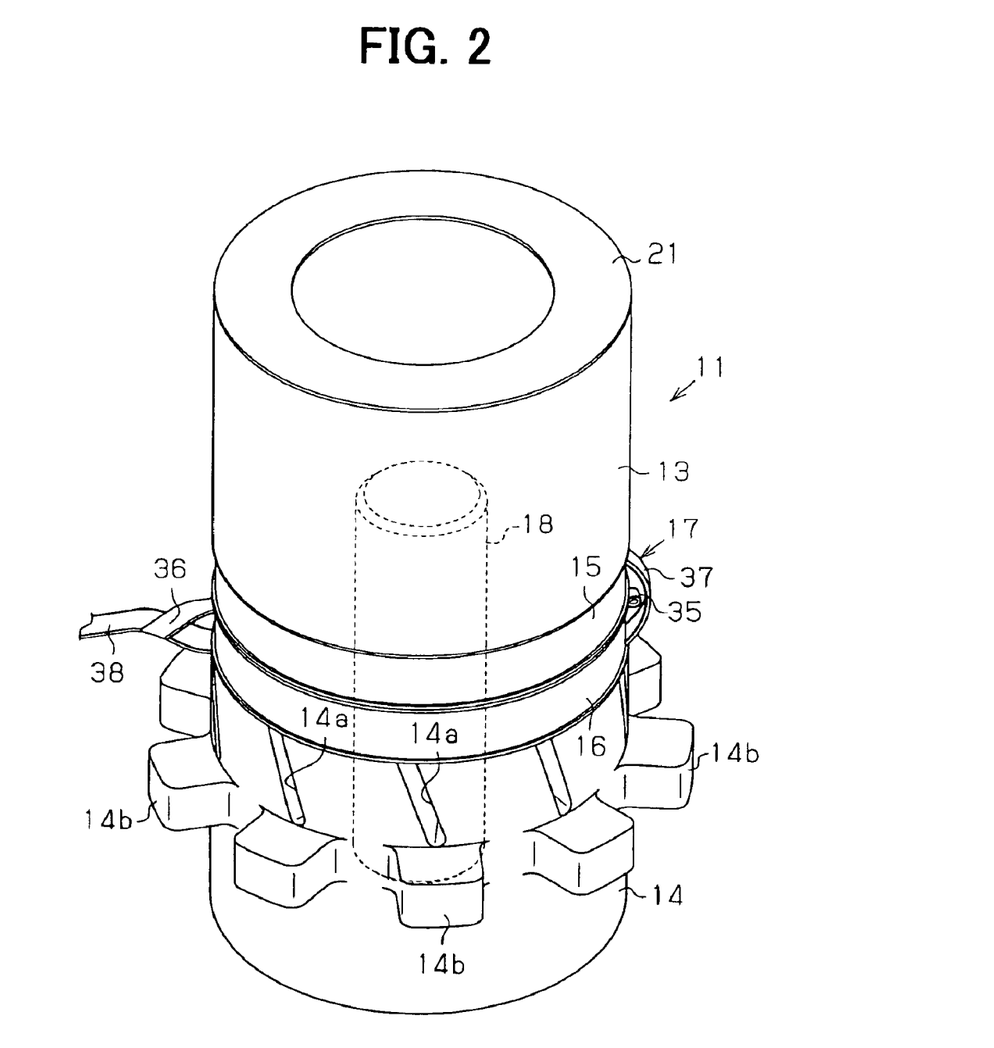
FIG. 2 is an enlarged schematic perspective view of an ultrasonic motor of the actuator shown in FIG. 1.

An actuator according to an embodiment of the present invention will be described with reference to FIGS. 1 to 4. As shown in FIG. 1, the actuator 1 includes a housing (serving as a support member) 2 and an ultrasonic motor 3 of a standing wave type.

The housing 2 is made of a plurality of components and is formed into a generally cylindrical shape. In one end (upper end in FIG. 1) of the housing 2, a rotatable shaft 5 is rotatably supported by ball bearings 4 at its one end. An engaging portion 5b, which has engaging grooves, is formed in the other end (lower end in FIG. 1) of the rotatable shaft 5. A flange 5a, which projects radially outward, is arranged adjacent to the engaging portion 5b in the rotatable shaft 5.

Figure 3:
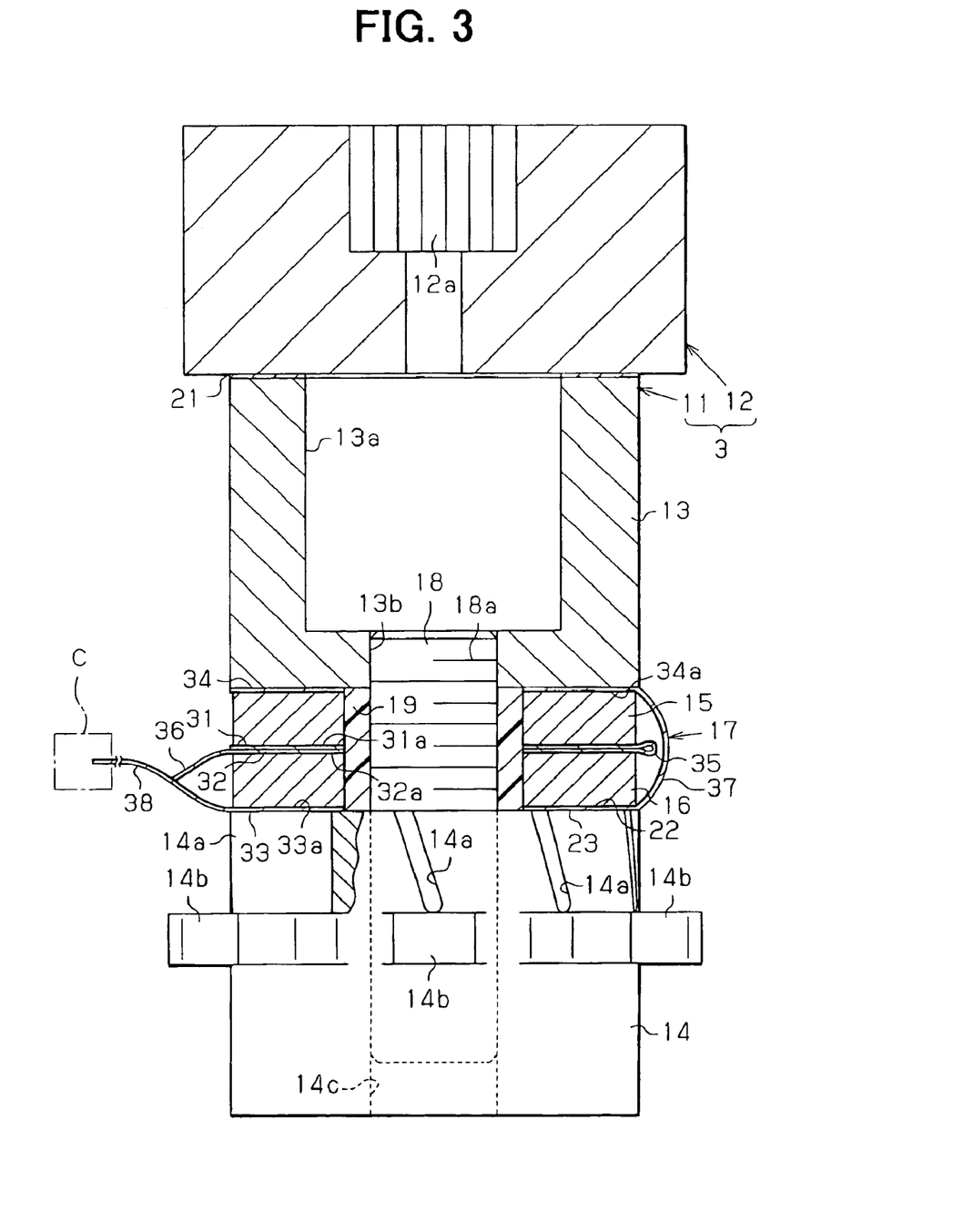
FIG. 3 is an enlarged schematic cross sectional view of the ultrasonic motor.

As shown in FIGS. 1 and 3, the ultrasonic motor 3 includes a stator 11 and a rotor 12. The stator 11 includes an upper metal block 13, a lower metal block 14, first and second piezoelectric elements 15, 16, a flexible aluminum-based connective arrangement 17, a bolt 18 and a dielectric collar 19.

The upper and lower metal blocks 13, 14 are formed as first and second aluminum-based metal blocks, which are made of aluminum or its alloy. In this embodiment, the upper and lower metal blocks 13, 14 are made of an aluminum alloy. The upper metal block 13 is formed into a generally cylindrical shape. A horn portion 13a, which has an increased inner diameter to amplify a vibration in a top end surface of the upper metal block 13, is formed in a top part of the upper metal block 13. A female thread 13b is formed in an inner peripheral surface of the upper metal block 13 except the horn portion 13a. A thin friction material 21 is bonded to the top end surface of the upper metal block 13.

The lower metal block 14 is formed into a generally cylindrical shape, which has an inner diameter and an outer diameter similar to the inner diameter and the outer diameter of the upper metal block 13 other than the horn portion 13a. A plurality of slits (recesses) 14a is formed in a top part (a top part in FIGS. 1 and 2) of an outer peripheral surface of the lower metal block 14. The slits 14a serve as vibration converting portions, which are recessed radially inward in the outer peripheral surface of the lower metal block 14 and generate a torsional vibration in response to a longitudinal vibration generated from the piezoelectric elements 15, 16 upon application of a high frequency voltage to the piezoelectric elements 15, 16. The slits 14a are arranged at generally equal angular intervals in the outer peripheral surface of the lower metal block 14 in the circumferential direction. Furthermore, each slit 14a is tilted relative a direction that is parallel to an axial direction of the stator 11.

A plurality of securing projections 14b is arranged in the outer peripheral surface of the lower metal block 14 at an axial intermediate location of the lower metal block 14. The securing projections 14b are arranged at generally equal angular intervals in the circumferential direction and project radially outward to secure the lower metal block 14 to an external member, i.e., the housing 2. A female thread 14c is formed in an inner peripheral surface (indicated by dotted lines in FIGS. 1 and 3) of the lower metal block 14.

Each of the first and second piezoelectric elements 15, 16 is formed into an annular disk shape and has a through hole that axially penetrates through the center of the piezoelectric elements 15, 16. An inner diameter of each of the first and second piezoelectric elements 15, 16 is greater than the inner diameter of the upper metal block 13 and of the lower metal block 14.

The flexible aluminum-based connective arrangement 17 has a conductive material part 22 (schematically indicated by a bold line in FIG. 3), which is made of an aluminum or its alloy that can be recycled together with the material (aluminum alloy in this embodiment) of the upper and lower metal blocks 13, 14 without requiring separate collection of the recyclable material. In the present embodiment, the conductive material part 22 of the flexible aluminum-based connective arrangement 17 is made of aluminum. The flexible aluminum-based connective arrangement 17 further includes a dielectric substrate 23 in addition to the conductive material part 22. The substrate 23 of the present embodiment is made of polyimide resin. A thickness of the substrate 23 of the present embodiment is set to 10 $\mu$m, which can minimize its influence on vibration characteristics of the stator 11 while providing sufficient electric insulation between the conductive material part 22 and the upper and lower metal blocks 13, 14.

Figure 4:
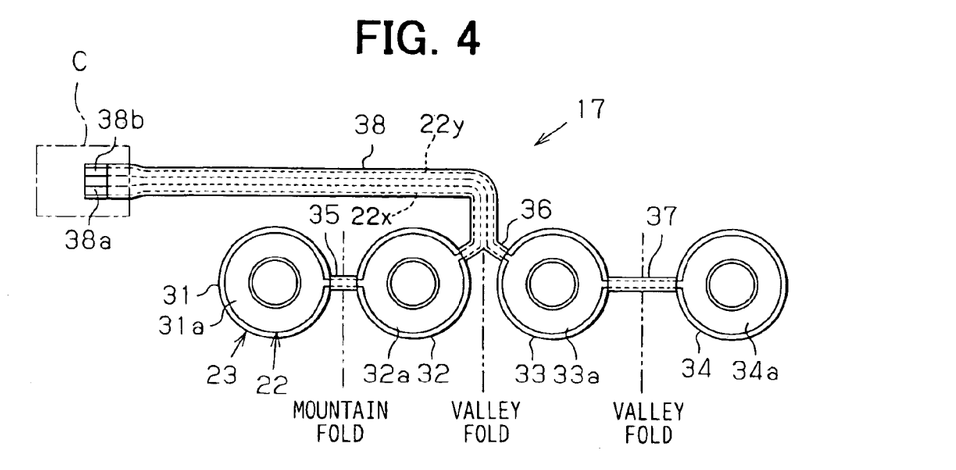
FIG. 4 is a plan view of a flexible aluminum-based connective arrangement of the ultrasonic motor.

FIG. 4 shows a deployed state of the flexible aluminum-based connective arrangement 17 before assembly of the flexible aluminum-based connective arrangement 17 into the stator 11. As shown in FIG. 4, the flexible aluminum-based connective arrangement 17 is formed as a single integral body and includes a plurality of annular disks 31–34 and a plurality of connecting portions 35–37, each of which connects between corresponding two of the disks 31–34. In the present embodiment, the disks 31–34 include first to fourth disks 31–34, and the connecting portions 35–37 include first to third connecting portions 35–37. A shape of each disk 31–34 corresponds to a shape of an opposed end surface of the piezoelectric element 15, 16, which is opposed to the disk 31–34. More specifically, an inner diameter and an outer diameter of each disk 31–34 are substantially the same as those of the opposed end of the piezoelectric element 15, 16. The flexible aluminum-based connective arrangement 17 further includes an extension 38. The extension 38 is electrically connected to a connector C, which in turn is electrically connected to an external device (control device or external power source). Sections of the conductive material part 22, which are located in the first to fourth disks 31–34, respectively, form first to fourth electrodes (integrated electrodes) 31a–34a, each of which serves as a conductive member electrically connected to a corresponding one of the first and second piezoelectric elements 15, 16.

In the deployed state, i.e., in the state before installation of the flexible aluminum-based connective arrangement 17 to the stator 11, the first to third connecting portions 35–37, the first to fourth disks 31–34 and the extension 38 are arranged in a single plane. Then, at the time of installing the flexible aluminum-based connective arrangement 17 to the stator 11, the flexible aluminum-based connective arrangement 17 is bent into a predetermined shape shown in FIGS. 1–3.

The first to fourth electrodes 31a–34a are all arranged on one side of the above-described single plane (i.e., on a front side of a plane of FIG. 4). The first to third connecting portions 35–37 are connected to the first to fourth disks 31–34 in such a manner that the first to fourth disks 31–34 (i.e., the centers of the first to fourth disks 31–34 or the centers of the first to fourth electrodes 31a–34a) are aligned along an imaginary straight line.

Specifically, the first connecting portion 35 connects between the first disk 31 and the second disk 32. The second connecting portion 36 connects between the second disk 32 and the third disk 33. The third connecting portion 37 connects between the third disk 33 and the fourth disk 34. Furthermore, in the present embodiment, the first to third connecting portions 35–37 are arranged to align the first to fourth disks 31–34 along the imaginary straight line, as described above. The extension 38 extends from the centered second connecting portion 36. The first electrode 31a is connected to the second electrode 32a by a portion of a first conductive line 22x of the conductive material part 22, which is arranged (embedded) in the first connecting portion 35. The second electrode 32a is connected to a first terminal 38a, which is exposed at a distal end of the extension 38 (more specifically, at a distal end of the first conductive line 22x), through another portion of the first conductive line 22x of the conductive material part 22, which is arranged (embedded) in the second connecting portion 36 and in the extension 38. The fourth electrode 34a is connected to the third electrode 33a through a portion of a second conductive line 22y of the conductive material part 22, which is arranged (embedded) in the third connecting portion 37. The third electrode 33a is connected to a second terminal 38b, which is exposed at the distal end of the extension 38 (more specifically, at a distal end of the second conductive line 22y), through another portion of the second conductive line 22y of the conductive material part 22, which is arranged (embedded) in the second connecting portion 36 and in the extension 38. In the present embodiment, the first and second electrodes 31a, 32a, which are arranged on one side (left side in FIG. 4) of the centered second connecting portion 36, form a first electrode pair (also referred to as a first group of aluminum-based electrodes), and the third and fourth electrodes 33a, 34a, which are arranged on the other side (right side in FIG. 4) of the centered second connecting portion 36, form a second electrode pair (also referred to as a second group of aluminum-based electrodes). The first electrode pair (i.e., the first and second electrodes 31a, 32a) is electrically connected to the first terminal 38a through the first conductive line 22x. The second electrode pair (i.e., the third and fourth electrodes 33a, 34a) is electrically connected to the second terminal 38b through the second conductive line 22y. One of the first electrode pair and the second electrode pair serves as positive electrode pair, and the other one of the first electrode pair and the second electrode pair serves as negative electrode pair.

The bolt 18 is formed into a generally cylindrical shape, which includes a male thread 18a in its outer peripheral surface to threadably engage with the female threads 13b, 14c.

The dielectric collar 19 is made of a dielectric resin and is shaped into an annular cylindrical shape. An outer diameter of the dielectric collar 19 is generally the same as an inner diameter of the first and second piezoelectric elements 15, 16 and of the first to fourth disks 31–34. An inner diameter of the dielectric collar 19 is generally the same as an outer diameter of the male thread 18a of the bolt 18 to receive the bolt therethrough.

The upper metal block 13 and the lower metal block 14 are fastened together by the bolt 18 that axially extends therebetween while the first and second piezoelectric elements 15, 16 and the first to fourth disks 31–34 (first to fourth electrodes 31a–34a) are arranged between the upper metal block 13 and the lower metal block 14.

Manufacturing of the stator 11 will be described further.

In a flexible aluminum-based conductive arrangement manufacturing process, the planar flexible aluminum-based connective arrangement 17 in the deployed state (i.e., the state shown in FIG. 4 before installation of the flexible aluminum-based connective arrangement 17 to the stator 11) is formed.

Then, in a fastening process, the upper metal block 13 and the lower metal block 14 are fastened together to form the stator 11 while the first and second piezoelectric elements 15, 16, the first to fourth disks 31–34 are held between the upper metal block 13 and the lower metal block 14.

More specifically, the fastening process includes a bending and positioning process.

In the bending and positioning process, the first to third connecting portions 35–37 are bent such that each of the first to fourth electrodes 31a–34a of the first to fourth disks 31–34 engages a corresponding one of the end surfaces of the first and second piezoelectric elements 15, 16, and the first to fourth disks 31–34 and the first and second piezoelectric elements 15, 16 are clamped between the upper metal block 13 and the lower metal block 14. In the present embodiment, when the flexible aluminum-based connective arrangement is seen from the one side where the first to fourth electrodes 31a–34a are exposed (FIG. 4), the first connecting portion 35 is bent to form a mountain fold, and each of the second and third connecting portions 36, 37 forms a valley fold. In this way, as shown in FIG. 3, the first and second electrodes 31a, 32a, which form the first electrode pair, are oriented in opposite directions and are thus placed in a back-to-back relationship. Also, the third electrode 33a of the second electrode pair is opposed to the second electrode 32a, and the fourth electrode 34a of the second electrode pair is opposed to the first electrode 31a. Furthermore, the fourth electrode 34a and the first electrode plate 31a are opposed to one another such that the first piezoelectric element 15 is interposed between the fourth electrode 34a and the first electrode 31a. In addition, the second electrode 32a and the third electrode 33a are opposed to one another such that the second piezoelectric element 16 is interposed between the second electrode 32a and the third electrode 33a. More specifically, a first axial end of the first piezoelectric element 15, which is adjacent to the upper metal block 13, directly contacts the fourth aluminum-based electrode 34a. A second axial end of the first piezoelectric element 15, which is opposite from the first axial end of the first piezoelectric element 15, directly contacts the first aluminum-based electrode 31a. A first axial end of the second piezoelectric element 16, which is adjacent to the second axial end of the first piezoelectric element 15, directly contacts the second aluminum-based electrode 32a. A second axial end of the second piezoelectric element 16, which is opposite from the first axial end of the second piezoelectric element 16 and is adjacent to the lower metal block 14, directly contacts the third aluminum-based electrode 33a.

Furthermore, in the fastening process, the lower metal block 14, the third disk 33, the second piezoelectric element 16, the second disk 32, the first disk 31, the first piezoelectric element 15, the fourth disk 34, the upper metal block 13 are stacked in this order, and the male thread 18a of the bolt 18 is threadably engaged with the female threads 13b, 14b to fasten them together. At this time, the first piezoelectric element 15 and the second piezoelectric element 16 are stacked in such a manner that a polarization direction of the first piezoelectric element 15 is opposite from a polarization direction of the second piezoelectric element 16 in the vertical direction in FIG. 3. Furthermore, the dielectric collar 19 is placed between the outer peripheral surface of the male thread 18a of the bolt 18 and the inner peripheral surfaces of the first and second piezoelectric elements 15, 16 and of the first to fourth disks 31–34. Thus, the outer peripheral surface of the bolt 18 is electrically insulated from the inner peripheral surfaces of the first and second piezoelectric elements 15, 16 and of the first to fourth disks 31–34 (first to fourth electrodes 31a–34a). Also, at this stage, the first and second piezoelectric elements 15, 16 and the first to fourth electrodes 31a–34a are electrically insulated from the upper and lower metal blocks 13, 14 by the substrate 23 of the flexible aluminum-based connective arrangement 17 in the axial direction.

The rotor 12 is made of iron or its alloy. The rotor 12 is formed into a generally cylindrical shape and has an outer diameter, which is larger than the outer diameter of the upper metal block 13 and the outer diameter of the lower metal block 14. A plurality of undepicted rotor slits (recesses), which generate a torsional vibration in response to the longitudinal vibration, is formed in an outer peripheral surface of the rotor 12. The rotor slits are arranged at equal angular intervals in a circumferential direction. The rotor 12 is slidably and rotatably urged against a top end surface of the stator 11, i.e., against the top end surface of the upper metal block 13 (the friction material 21).

More specifically, an engaging recess 12a, which is engageable with the engaging portion 5b of the rotatable shaft 5, is formed in one end (upper end in FIG. 3) of the rotor 12. When the engaging portion 5b is fitted into the engaging recess 12a, the rotor 12 is connected to the rotatable shaft 5 in such a manner that the rotor 12 is non-rotatable to the rotatable shaft 5 and is axially movable relative to the engaging portion 5b. Furthermore, at this time, a Belleville spring 41 is interposed between the flange 5a of the rotatable shaft 5 and the rotor 12. The stator 11 is received in the housing 2, and the securing projections 14b of the stator 11 is connected to the housing 2 through a connecting member 42 to secure the stator 11 to the housing 2 in such a manner that the top end surface of the stator 11 has pressure engagement with the rotor 12 (compressing the Belleville spring 41). At this state, the distal end of the extension 38, i.e., the first and second terminals 38a, 38b (FIG. 4) of the flexible aluminum-based connective arrangement 17 is placed outside of the housing 2. The first and second terminals 38a, 38b are received and held in a housing of the connector C to serve as connection terminals of the connector C.

In the thus constructed actuator 1 (ultrasonic motor 3), when the control device (not shown) is operated to apply a high frequency voltage to the first to fourth electrodes 31a–34a (i.e., between the first electrode pair and the second electrode pair) through the first and second terminals 38a, 38b, a relatively large longitudinal vibration is generated by the first and second piezoelectric elements 15, 16 (a degree of the longitudinal vibration is a sum of vibrations of the first and second piezoelectric elements 15, 16). Then, torsional vibrations are generated by the slits 14a of the stator 11 and the rotor slits (not shown) of the rotor 12 in response to the longitudinal vibration. Thus, the rotor 12 is rotated by lift force generated by a longitudinal vibration component and a rotational drive force generated by a torsional vibration component, and the rotatable shaft 5 is rotated together with the rotor 12.

Next, advantages of the above embodiment will be described.

(1) The conductive members, which are electrically connected to the first and second piezoelectric elements 15, 16, include the first to fourth aluminum-based electrodes 31a–34a of the flexible aluminum-based connective arrangement 17 that is clamped together with the first and second piezoelectric elements 15, 16 between the upper metal block 13 and the lower metal block 14. Thus, at the time of recycling (in a recycle process), unlike the previously proposed ultrasonic motor, it is not required to remove copper (more specifically, electrode plates made of copper or its alloy) from the stator 11, which cannot be easily disassembled. Thus, a recyclability of the actuator 1 (ultrasonic motor 3) is further improved.

(2) The flexible aluminum-based connective arrangement 17 integrally includes the first to fourth disks 31–34, each of which is shaped to correspond with the end surface of the corresponding piezoelectric element 15, 16, and the first to third connecting portions 35–37, each of which connects between the corresponding disks 31, 34. Thus, the number of components can be minimized.

(3) The flexible aluminum-based connective arrangement 17 further integrally includes the extension 38, which is connected to the connector C to be connected to the external device (control device). Thus, the number of components can be further minimized. In addition, unlike the previously proposed ultrasonic motor, it is not required to solder electrical wires to the electrode plates, and thus there is no soldering related failure, such as cracking at the soldered portions.

(4) The first to third connecting portions 35–37, which are originally formed as the flat component together with first to fourth disks 31–34, are bent in the bending and positioning process. Thus, the flexible aluminum-based connective arrangement 17 can be more easily formed in the flexible aluminum-based conductive arrangement manufacturing process in comparison to the case where the flexible aluminum-based connective arrangement 17 is formed to have, for example, steps at the unassembled component state (FIG. 4).

(5) The first to fourth electrodes 31a–34a are all arranged on one side of the single plane (on the front side of the plane of FIG. 4), so that manufacturing of the first to fourth electrodes 31a–34a are eased in comparison to the case where one or more of the first to fourth electrodes 31a–34a is arranged on the one side of the single plane, and the rest of the first to fourth electrodes 31a–34a is arranged on the other side of the single plane. Furthermore, in the present embodiment, the first and second terminals 38a, 38b are all arranged on the one side of the single plane (on the front side of the plane of FIG. 4), so that the first and second terminals 38a, 38b can be manufactured together with the first to fourth electrodes 31a–34a in a single process. Thus, the manufacturing of the flexible aluminum-based connective arrangement 17 is eased.

(6) The first and second electrodes 31a, 32a, which are arranged on one side of the centered second connecting portion 36, form the first electrode pair, and the third and fourth electrodes 33a, 34a, which are arranged on the other side of the centered second connecting portion 36, form the second electrode pair. Furthermore, the extension 38 extends from the centered second connecting portion 36. Thus, the electrical wiring (i.e., the conductive lines 22x, 22y) to the two types of electrodes (first and second electrode pairs) can be easily arranged and can be minimized. More specifically, for example, when the extension extends from the first connecting portion 35 located on the one side of the centered second connecting portion 36, electrical wiring to the second electrode pair (i.e., the third and fourth electrodes 33a, 34a) located on the other side of the centered second connecting portion 36 becomes more complicated and elongated. However, with the above symmetrical arrangement of the electrodes, the electrical wiring can be more easily arranged and minimized.

(7) The first to third connecting portions 35–37 connect the first to fourth disks 31, 34 along the straight line. With this arrangement, bending lines, which are indicated by dot-dot-dash lines in FIG. 4, are oriented in the same direction (top-bottom direction in FIG. 4). Thus, the bending process of the first to third connecting portions 35–37 is eased, and the first to fourth disks 31–34 can be easily arranged.

(8) The first and second piezoelectric elements 15, 16 and the first to fourth electrodes 31a–34a are electrically insulated from the upper and lower metal blocks 13, 14 by the substrate 23 of the flexible aluminum-based connective arrangement 17. Thus, when the upper and lower metal blocks 13, 14 are secured to the housing 2, any other insulating means is not required. More specifically, with reference to FIG. 8, in the previously proposed ultrasonic motor, when the securing projections 83b are secured to the housing 93 through a connecting member 92, a dielectric resin material 94 or the like, which is indicated by a solid bold line in FIG. 8, is required between the securing projections 83b and the connecting member 92. Furthermore, in the previously proposed ultrasonic motor depicted in FIG. 8, a separate engaging member 96 made of a dielectric resin material is secured to a rotatable shaft 95, and the rotatable shaft 95 is connected to the rotor 82 through the engaging member 96. Contrary to this, in the case of the actuator 1 according to the present embodiment, the separate dielectric resin material 94 and the separate dielectric engaging member 96 are not required.

The above embodiment can be modified as follows.

The flexible aluminum-based connective arrangement 17 of the above embodiment can be changed to any other appropriate shape as long as the conductive material part 22 of the flexible aluminum-based connective arrangement 17 is made of aluminum or its alloy. For example, the flexible aluminum-based connective arrangement 17 can be modified to any one of flexible aluminum-based connective arrangements 51, 61, 71 shown in FIGS. 5 to 7.

Figure 5:
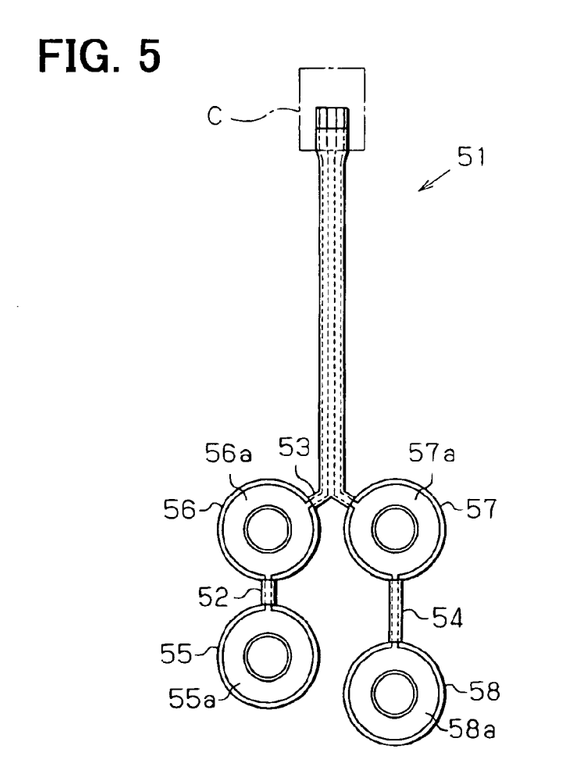
FIG. 5 is a plan view showing one modification of the flexible aluminum-based connective arrangement of FIG. 4.

With reference to FIG. 5, in the flexible aluminum-based connective arrangement 51, first to third connecting portions 52–54 connect first to fourth annular disks 55–58 (first to fourth electrodes 55a–58a) along a line, more specifically, along a bent line. More specifically, in the present instance, the first to third connecting portions 52–54 connect the first to fourth disks 55–58 such that the first to fourth disks 55–58 are arranged in corners, respectively, of an imaginary quadrangle.

Figure 6:
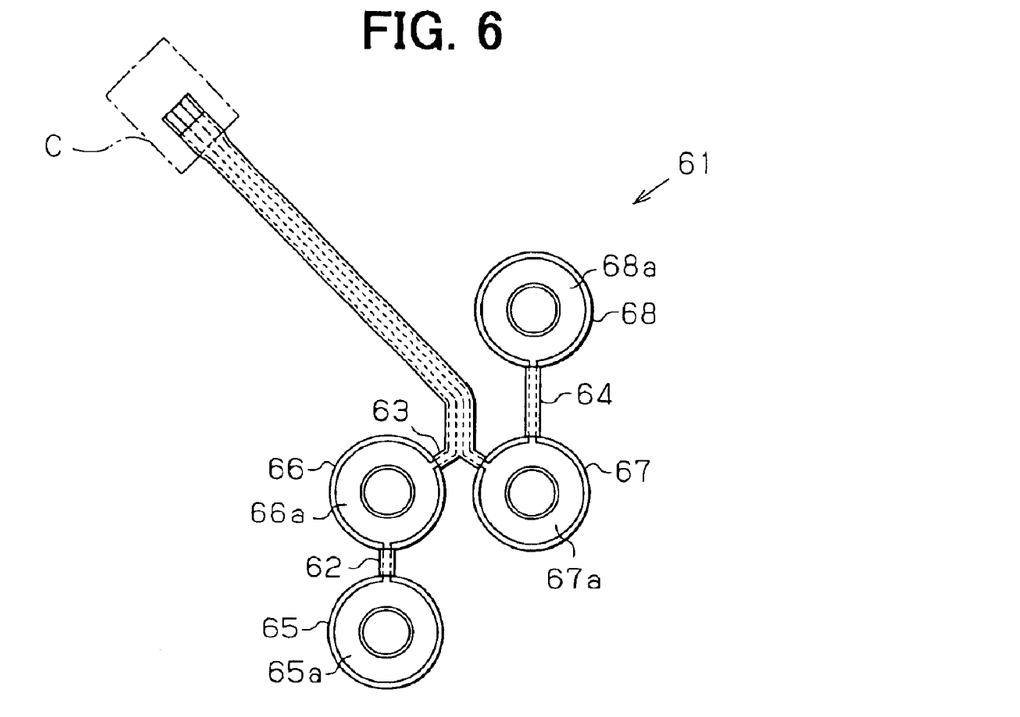
FIG. 6 is a plan view showing another modification of the flexible aluminum-based connective arrangement of the FIG. 4.

With reference to FIG. 6, in the flexible aluminum-based connective arrangement 61, first to third connecting portions 62–64 connect first to fourth annular disks 65–68 (first to fourth electrodes 65a–68a) along a line, more specifically, along a bent line. More specifically, in the present instance, the first to third connecting portions 62–64 connect the first to fourth disks 65–68 such that an imaginary line, which connects a center of each of the first to fourth disks 65–68, forms a crank line that is bent twice to define two right angles.

Figure 7:
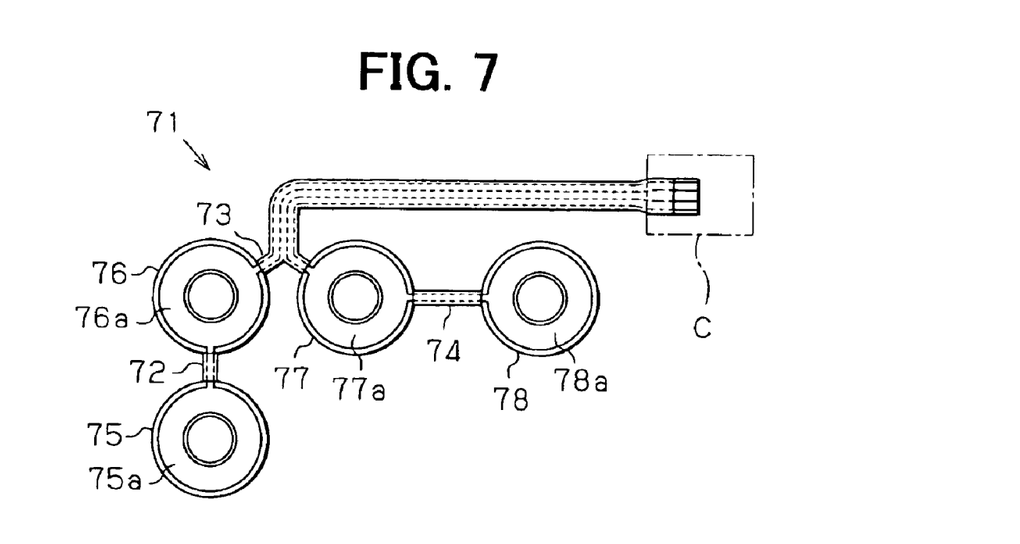
FIG. 7 is a plan view showing another modification of the flexible aluminum-based connective arrangement of the FIG. 4.

With reference to FIG. 7, in the flexible aluminum-based connective arrangement 71, first to third connecting portions 72–74 connect first to fourth annular disks 75–78 (first to fourth electrodes 75a–78a) along a line, more specifically, along a bent line. More specifically, in the present instance, the first to third connecting portions 72–74 connect the first to fourth disks 75–78 such that an imaginary straight line, which extends through a center of the first disk 75 and a center of the second disk 76, defines a right angle with an imaginary straight line, which extends through each center of the second to fourth disks 76–78.

Even with the above modifications (FIGS. 5–7), advantages similar to those discussed in the above sections (1)–(6) and (8) can be achieved. Furthermore, in order to improve productivity, any one of the flexible aluminum-based connective arrangements 17, 51, 61, 71 can be selected based on a desired size and/or shape that is manufacturable with a designated manufacturing apparatus.

In the above embodiment, the extension 38, which is connected to the connector C, is formed integrally with the flexible aluminum-based connective arrangement 17. Alternatively, a separate wiring can be used to connect between the flexible aluminum-based connective arrangement and the connector C.

In the above embodiment, the first to fourth electrodes 31a–34a are all arranged on the one side of the single plane. However, one or more of the first to fourth electrodes 31a–34a can be arranged on the one side of the single plane, and the rest of the first to fourth electrodes 31a–34a can be arranged on the other side of the single plane, if desired. Furthermore, the disk, which is interposed between the first piezoelectric element 15 and the second piezoelectric element 16, can have two electrodes on its axial end surfaces, respectively, to engage with the first and second piezoelectric elements 15, 16, respectively. With this arrangement, the number of the disks can be reduced to three.

In the above embodiment, the extension 38 extends from the centered second connecting portion 36. Alternatively, the extension can extend from any other appropriate location, such as from the first disk 31 or the first connecting portion 35 when the extension extends from the first disk 31 or the first connecting portion 35, an additional electrical wiring to the second electrode pair (i.e., the third and fourth electrodes 33, 34) needs to be provided at an outer peripheral of the second disk 32.

In the above embodiment, the single flexible aluminum-based connective arrangement 17 is used. Alternatively, more that one flexible aluminum-based connective arrangement can be used. For example, one flexible aluminum-based connective arrangement, which includes the first electrode pair (i.e., the first and second electrodes 31a, 32a), and another flexible aluminum-based connective arrangement, which includes the second electrode pair (i.e., the third and fourth electrodes 33a, 34a) can be provided.

In the above embodiment, the rotor 12 is made of iron or its alloy. Alternatively, the rotor 12 can be made of aluminum or its alloy. In this way, collection of the recyclable material from the stator 11 needs not be performed separately from collection of the recyclable material from the rotor 12. This allows an improvement in the recyclability of the material.

In the above embodiment, the present invention is embodied in the ultrasonic motor, which has the first and second piezoelectric elements 15, 16. Alternatively, the present invention can be embodied in an ultrasonic motor, which has only one piezoelectric element or more than two piezoelectric elements. In such a case, the structure (e.g., the number of the disks) of the flexible aluminum-based connective arrangement 17 needs to be changed in an appropriate manner.

In the above embodiment, the first to fourth electrodes 31a–34a, which are electrically connected to the first and second piezoelectric elements 15, 16, are used as the voltage supply electrodes. Alternatively, one or more of the first to fourth electrodes can be used in any other usage, for example, can be used as a feedback electrode, which conducts electrical voltage generated in the piezoelectric elements to the control device).

The bolt 18 of the above embodiment can be changed to any other fastening member, such as one that has bendable ends to be bent to securely connect between the components.

Additional advantages and modifications will readily occur to those skilled in the art. The invention in its broader terms is therefore not limited to the specific details, representative apparatus, and illustrative examples shown and described.

What is claimed is:

1. An ultrasonic motor comprising:
 a stator that includes:
  at least one piezoelectric element;
  a flexible aluminum-based connective arrangement that includes a plurality of aluminum-based electrodes, which apply a voltage to the at least one piezoelectric element to generate a vibration from the at least one piezoelectric element, wherein each aluminum-based electrode is made of one of aluminum and an aluminum alloy and directly contacts a corresponding one of axial ends of the at least one piezoelectric element; and
  a plurality of aluminum-based metal blocks, each of which is made of one of aluminum and an aluminum alloy, wherein the at least one piezoelectric element and the aluminum-based electrodes are interposed between corresponding two of the aluminum-based metal blocks; and
 a rotor that is slidably and rotatably urged against the stator, wherein the rotor is rotated upon generation of the vibration in the stator, wherein:
 the plurality of aluminum-based electrodes includes a first group of aluminum-based electrodes and a second group of aluminum-based electrodes;
 the flexible aluminum-based connective arrangement further includes a first conductive line and a second conductive line;
 the first conductive line is electrically connected to the aluminum-based electrodes of the first group; and
 the second conductive line is electrically connected to the aluminum-based electrodes of the second group.

2. The ultrasonic motor according to claim 1, wherein the flexible aluminum-based connective arrangement is a single flexible aluminum-based connective arrangement present in the stator.

3. The ultrasonic motor according to claim 1, wherein the flexible aluminum-based connective arrangement is integrally formed and further includes:
 a plurality of disks, each of which has at least one of the aluminum-based electrodes; and
 a plurality of connecting portions, each of which connects between corresponding two of the disks.

4. The ultrasonic motor according to claim 3, further comprising a connector that is connected to an external power source, wherein the flexible aluminum-based connective arrangement further includes an extension that is electrically connected to the connector at one end of the extension and is electrically connected to one of the disks and the connecting portions at the other end of the extension.

5. The ultrasonic motor according to claim 1, wherein:
 the flexible aluminum-based connective arrangement further includes a dielectric substrate; and
 the first group of aluminum-based electrodes, the second group of aluminum-based electrodes, the first conductive line and the second conductive line are formed on the dielectric substrate.

6. The ultrasonic motor according to claim 5, wherein the at least one piezoelectric element includes first and second piezoelectric elements.

7. The ultrasonic motor according to claim 6, wherein:
 the corresponding two of the aluminum-based metal blocks are first and second aluminum-based metal blocks, respectively;
 the first group of aluminum-based electrodes includes first and second aluminum-based electrodes;
 the second group of aluminum-based electrodes includes third and fourth aluminum-based electrodes;
 a first axial end of the first piezoelectric element, which is adjacent to the first aluminum-based metal block, directly contacts the fourth aluminum-based electrode;
 a second axial end of the first piezoelectric element, which is opposite from the first axial end of the first piezoelectric element, directly contacts the first aluminum-based electrode;
 a first axial end of the second piezoelectric element, which is adjacent to the second axial end of the first piezoelectric element, directly contacts the second aluminum-based electrode; and
 a second axial end of the second piezoelectric element, which is opposite from the first axial end of the second piezoelectric element and is adjacent to the second aluminum-based metal block, directly contacts the third aluminum-based electrode.

8. The ultrasonic motor according to claim 7, wherein:
 the first aluminum-based electrode is electrically insulated from the second aluminum-based electrode by the dielectric substrate;
 the third aluminum-based electrode is electrically insulated from the second aluminum-based metal block by the dielectric substrate; and
 the fourth aluminum-based electrode is electrically insulated from the first aluminum-based metal block by the dielectric substrate.

9. The ultrasonic motor according to claim 1, wherein the rotor is made of one of aluminum and an aluminum alloy.

* * * * *